United States Patent
Noguchi et al.

[11] Patent Number: 6,001,466
[45] Date of Patent: Dec. 14, 1999

[54] COATING COMPOSITION, PRINTING MEDIUM AND IMAGE FORMING PROCESS USING THE SAME

[75] Inventors: Hiromichi Noguchi, Hachioji; Masahiko Higuma, Togane; Yuko Sato, Kawasaki, all of Japan

[73] Assignee: Canon Kabushiki Kaisha, Tokyo, Japan

[21] Appl. No.: 08/838,122

[22] Filed: Apr. 15, 1997

[30] Foreign Application Priority Data

| Apr. 16, 1996 | [JP] | Japan | 8-094058 |
| Feb. 24, 1997 | [JP] | Japan | 9-037048 |
| Mar. 31, 1997 | [JP] | Japan | 9-080194 |

[51] Int. Cl.$^6$ ............... B41M 5/00; B32B 5/16
[52] U.S. Cl. ............ 428/327; 428/195; 428/206; 428/304.4; 428/323; 428/462; 428/521; 428/522; 428/913; 347/105; 427/261; 427/385.5; 427/386; 427/391
[58] Field of Search ............ 428/195, 206, 428/304.4, 318.4, 323, 327, 402, 411.1, 521, 522, 913; 347/105; 427/258, 261, 385.5, 386, 391

[56] References Cited

U.S. PATENT DOCUMENTS

| 4,517,244 | 5/1985 | Kobayashi et al. | 428/342 |
| 4,542,059 | 9/1985 | Toganoh et al. | 428/141 |
| 4,650,714 | 3/1987 | Kojima et al. | 428/341 |
| 4,785,313 | 11/1988 | Higuma et al. | 346/135.1 |
| 4,877,680 | 10/1989 | Sakaki et al. | 428/332 |
| 5,027,131 | 6/1991 | Hasegawa et al. | 346/1.1 |
| 5,101,218 | 3/1992 | Sakaki et al. | 346/1.1 |
| 5,120,601 | 6/1992 | Kotaki et al. | 428/327 |
| 5,139,868 | 8/1992 | Mori et al. | 428/327 |
| 5,262,238 | 11/1993 | Trouve et al. | 428/402 |
| 5,478,631 | 12/1995 | Kawane et al. | 428/212 |
| 5,681,643 | 10/1997 | Noguchi et al. | 428/195 |
| 5,733,637 | 3/1998 | Moriya et al. | 428/207 |
| 5,798,397 | 8/1998 | Noguchi et al. | 522/81 |
| 5,861,194 | 1/1999 | Noguchi et al. | 427/386 |

FOREIGN PATENT DOCUMENTS

| 448472 | 5/1974 | Australia . |
| 0350257A1 | 1/1990 | European Pat. Off. . |
| 0383273A1 | 8/1990 | European Pat. Off. . |
| 0416762A1 | 3/1991 | European Pat. Off. . |
| 59-35977 | 2/1984 | Japan . |
| 2-214787 | 8/1990 | Japan . |
| 2-223466 | 9/1990 | Japan . |
| 7-61114 | 3/1995 | Japan . |
| 7-228039 | 8/1995 | Japan . |
| 10-212323 | 8/1998 | Japan . |

*Primary Examiner*—Marie Yamnitzky
*Attorney, Agent, or Firm*—Fitzpatrick, Cella, Harper & Scinto

[57] ABSTRACT

A coating composition comprising cationic fine particles of a crosslinked resin, which have an average particle diameter ranging from 0.1 to 100 $\mu$m and a water absorption capacity of at most 25 times by volume, and a binder resin; and a printing medium comprising a base material and an ink-receiving layer provided on the base material, wherein the ink-receiving layer contains cationic fine particles of a crosslinked resin, which have an average particle diameter ranging from 0.1 to 100 $\mu$m and a water absorption capacity of at most 25 times by volume, and a binder resin.

26 Claims, No Drawings

COATING COMPOSITION, PRINTING MEDIUM AND IMAGE FORMING PROCESS USING THE SAME

BACKGROUND OF THE INVENTION

1. Field of the Invention

The present invention relates to a printing medium suitable for use in forming images with water-based inks, and an image forming process, and particularly to a printing medium suitable for use in multi-color printing using water-based inks containing a water-soluble dye and an image forming process using this medium.

The present invention also relates to a coating composition suitable for use in producing such a printing medium, and an image forming process using the medium.

2. Related Background Art

With the improvement in performance of ink-jet printing apparatus, such as speeding up of printing and multi-coloring of images, in recent years, printing media have also been required to have higher and wider properties. More specifically, they are required to simultaneously satisfy, for example, the following properties:

(1) having high ink absorptivity (ink absorbing capacity being great, and ink absorbing time being short);

(2) providing printed dots high in optical density and clear in periphery;

(3) providing printed dots having a substantially round shape and a smooth periphery;

(4) being able to stably store images formed thereon for a long period of time without deterioration of quality (in particular, under conditions of a high-temperature and high-humidity environment);

(5) undergoing little changes in the properties even at varied temperatures and humidities and no curling;

(6) undergoing no blocking; and (7) providing prints the images of which do not fade even when the prints are posted over a long period of time.

As printing media used in such ink-jet printing systems, for example, Japanese Patent Application Laid-Open No. 59-35977 describes exclusive coated paper provided with a coating layer containing a pigment.

However, general paper for ink-jet including such coated paper ensures its ink absorbency by using a great amount of an inorganic porous pigment. When inorganic particles typified by, for example, silica are used, the following problems are offered. That is, (1) since inks are absorbed in voids defined by silica, their volume is limited by the void volume;

(2) the resulting medium cannot be used as a printing medium of which transparency is required;

(3) the resulting medium has no dye-fixing property, and causes migration of dyes in a high-humidity environment;

(4) it is difficult to constitute a printing medium having such high ink absorbency and water resistance that it is applicable to any high-speed color ink-jet printer.

(5) when the resulting printing medium is required to have transparency or high gloss, it is necessary to use an ink-absorbent material scarcely undergoing light scattering; and (6) since some inorganic pigment may have a catalytic action on the deterioration reaction of dyes, it is desirable to use an ink-absorbent material by which the deterioration of the dyes is prevented.

By the way, it has been known to use water-absorbent fine particles composed of an organic polymer in printing media for ink-jet printing. For example, Japanese Patent Application Laid-Open No. 2-223466 discloses a printing medium provided with an ink-receiving layer containing high water-absorbent resin particles and a binder, while Japanese Patent Application Laid-Open No. 7-61114 discloses a printing sheet comprising water-absorbent gel particles. Further, Japanese Patent Application Laid-Open No. 7-228039 discloses an ink-receiving layer composed of partially crosslinked multi-layer fine particles and a binder.

The resin particles disclosed in Japanese Patent Application Laid-Open No. 2-223466 have a feature that they can impart higher ink absorbency compared with inorganic particles. Since the resin particles have such high water absorbency that they can absorb water 50 to 1,000 times as much as their own weight, however, the resulting printing medium tends to cause deterioration in the resolution of images and is liable to lower the strength of its portions on which images have been formed.

In the conventional typical water-absorbent particles, their rate of water absorption and water retentivity are adjusted by crosslinking polymer chains having carboxyl groups.

Since most of dyes used in inks for an ink-jet system have a sulfonic group and/or a carboxyl group like acid dyes and direct dyes, the dye molecules diffuse together with solvents for inks after printing when the conventional water-absorbent particles having carboxyl groups are used in a printing medium, so that such a printing medium is difficult to be colored. Besides, since the printing medium is easy to exude the dyes by application of water, it has been necessary to improve a color-fixing property and a water fastness of images to be formed.

Further, the conventional resin particles absorb water in excess, so that coating films formed therefrom tend to lower their strength. The films also involve a problem that since they tend to cause tacking, the resulting prints are poor in storability.

SUMMARY OF THE INVENTION

It is therefore an object of the present invention to provide a printing medium which can improve the color-fixing property of dyes, provides images having high water fastness and hardly causes migration of dyes even at high humidity.

Another object of the present invention is to provide a transparent printing medium which satisfies an ink absorbing speed and an ink absorbing capacity required by color ink-jet printers.

A further object of the present invention is to provide a process and a coating composition for producing the above printing media, and an image forming process using the printing media.

The above objects can be achieved by the present invention described below.

According to the present invention, there is thus provided a coating composition comprising cationic fine particles of a crosslinked resin, which have an average particle diameter ranging from 0.1 to 100 $\mu$m and a water absorption capacity of at most 25 times by volume, and a binder resin.

According to the present invention, there is also provided a printing medium comprising a base material and an ink-receiving layer provided on the base material, wherein the ink-receiving layer contains cationic fine particles of a crosslinked resin, which have an average particle diameter ranging from 0.1 to 100 μm and a water absorption capacity of at most 25 times by volume, and a binder resin.

According to the present invention, there is further provided an image forming process, comprising the steps of providing inks and ejecting the inks in the form of droplets from orifices in response to printing signals to apply them to the printing medium described above to form an image.

According to the present invention, there is still further provided an image forming process, comprising the steps of coating a base material with the coating composition described above to form an ink-receiving layer, and applying inks to the ink-receiving layer to form an image.

According to the present invention, there is yet still further provided a process for producing a printing medium, comprising coating a base material with the coating composition described above to form an ink-receiving layer.

DESCRIPTION OF THE PREFERRED EMBODIMENTS

The present invention will hereinafter be described in more detail.

The preparation process of the fine particles of a resin, which characterize the present invention and have a cationic group, a crosslinked structure in their interiors and an average particle diameter ranging from 0.1 μm to 100 μm, will be first described.

Polymerizable monomers used in the preparation of the cationic fine particles used in the present invention to impart a monofunctional cationicity include (meth)acrylic esters having a tertiary amino group, for example, N,N-dimethylaminoethyl methacrylate, N,N-dimethylaminoethyl acrylate, N,N-dimethylaminopropyl methacrylate and N,N-dimethylaminopropyl acrylate; (meth)acrylamides having a tertiary amino group, for example, N,N-dimethylaminoacrylamide, N,N-dimethylaminomethacrylamide, N,N-dimethylaminopropylacrylamide, N,N-dimethylaminoethylacrylamide, N,N-dimethylaminoethylmethacrylamide, N,N-dimethylaminopropylmethacrylamide, N,N-dimethylamino-2-hydroxypropylacrylamide and N,N-dimethylamino-2-hydroxypropylmethacrylamide; etc. These monomers having a tertiary amino group are dissolved in water in a state neutralized with an acid before use. Substances obtained by quaternizing the above-mentioned monomers in a method known per se in the art may also be used.

When the monofunctional monomer is used, a crosslinking agent or a crosslinking oligomer having an acryloyl group at its molecular chain terminal must be used in combination. Such a substance is selected from among substances which are soluble in a solvent for polymerization of the monomer used and have a fixed copolymerizability. Suitable examples thereof include methylenebisacrylamide, methylenebismethacrylamide; polyethylene glycol di(meth) acrylates, for example, NK Ester A600, A400 and A200 (all, trade names; products of Shin-Nakamura Chemical Co., Ltd.); and the water-soluble acrylic esters of polyepoxides, or Denacol Acrylates (products of Nagase Chemicals, Ltd.) as examples of industrial products. The crosslinking may be conducted with a nonpolymerizing crosslinking agent, polyepoxide or polyaldehyde. However, the above-mentioned bifunctional vinyl monomers are preferred because the formation of particles and crosslinking are carried out at the same time.

There is also a process in which a polyfunctional cationic compound having at least one cationic group and at least two polymerizable groups in its molecule is used as a material useful for the preparation of the cationic fine particles. Such a substance may be easily provided in the following manner. The substance having the cationic group and crosslinkable groups in its molecule can be obtained in accordance with the following processes:

(1) A polyepoxide having at least three epoxy groups is subjected to a quaternizing reaction with at least one amine and to a reaction for adding at least two acrylic esters;

(2) An acrylic monomer having a tertiary amino group, such as dimethylaminoethyl (meth)acrylate, is added to a polyepoxide having at least three epoxy groups; and (3) At least one acryl group of a polyacryloyl compound having at least three acryloyl groups is subjected to an addition reaction with trimethylamine or the like into a cationized product.

When structural examples of such compounds are represented by general formulae, they are classified into the following formulae (1) to (8).

The use of a cationic polyacryloyl compound represented by any of the following general formulae (1) to (8) for imparting cationicity to the fine particles used in the present invention is advantageous because it can be provided with little difficulty. It goes without saying that such a compound is not limited to those of the following structures, and its structure may be changed into various forms according to the intended requirements of physical properties.

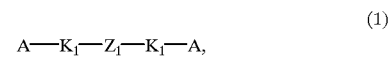

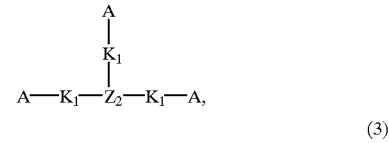

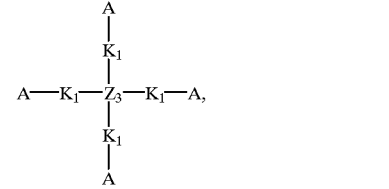

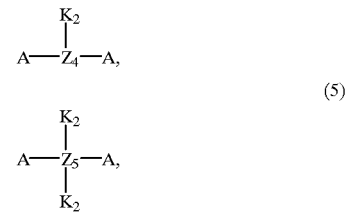

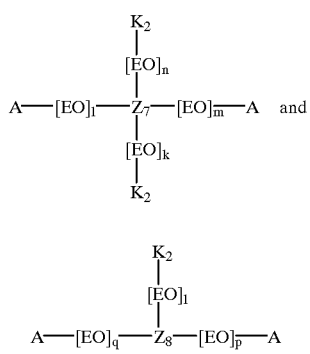
(7)

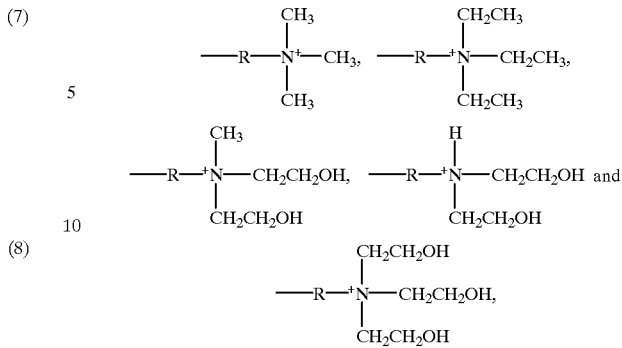

(8)

wherein $Z_1$ to $Z_8$ are independently a residue derived from a polyhydric alcohol or a polyepoxide, EO is an ethylene oxide chain, $K_1$ is a cationic group in a molecular chain represented by any one of

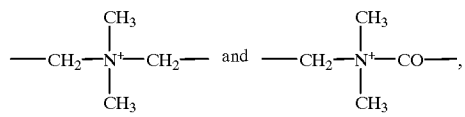

$K_2$ is a cationic group at a terminal of a molecular chain represented by any one of in which R is a linking group selected from the group consisting of $-CH_2CH(OH)CH_2-$, $-CH_2-$, $-CH_2CH_2-$ and $-CH_2OCH_2-$, n, m, k, p, q, i and j are independently the number of ethylene oxide chains and an integer ranging from 1 to 50, a counter ion to the cationic group of the compounds (1) to (8) is a residue of acids, such as chloride, sulfate, acetate and lactate ions, and A is a residue of a (meth)acrylic ester or a (meth)acrylamide.

Examples of A include $CH_2=CHCOO(CH_2)_a-$, $CH_2=C(CH_3)COO(CH_2)_b-$, $CH_2=CHCONH(CH_2)_c-$ and $CH_2=C(CH_3)CONH(CH_2)_d-$ in which a, b, c and d are independently 0, 1 or 2.

Preferable specific examples of the oligomers are mentioned below.

(Compound 1-1)

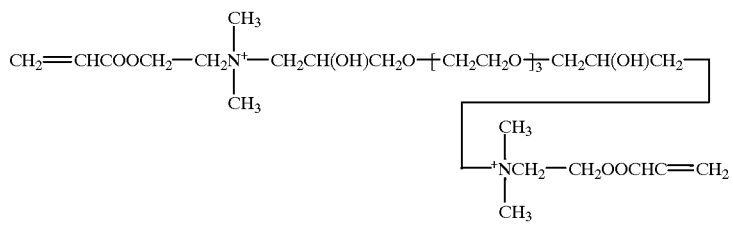

(Compound 1-2)

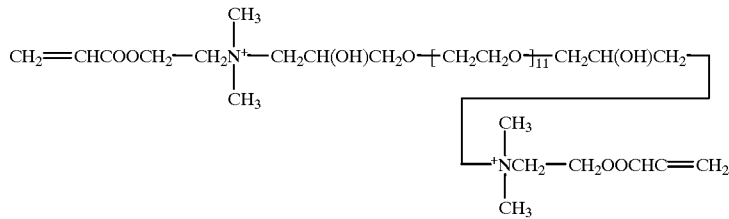

(Compound 1-3)

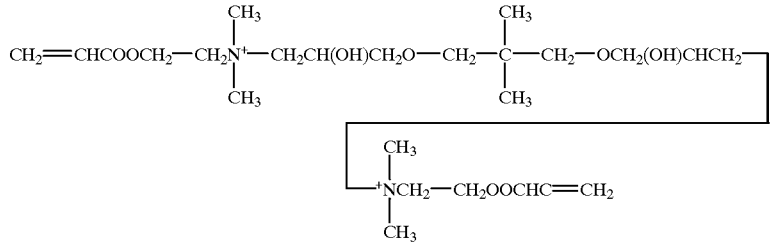

(Compound 1-4)
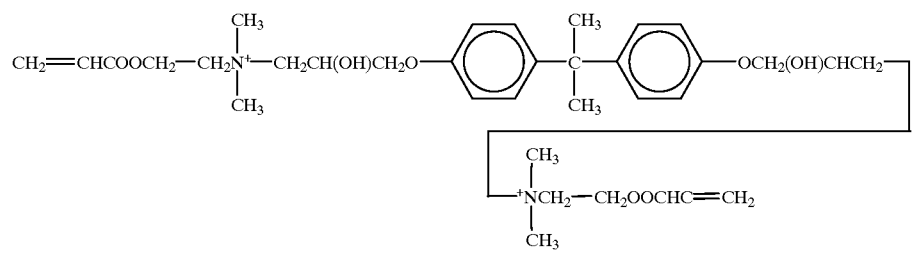
(Compound 1-5)
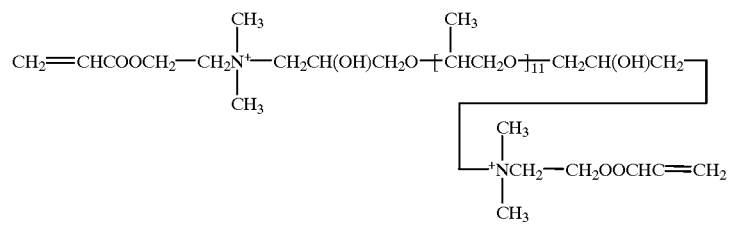
(Compound 1-6)
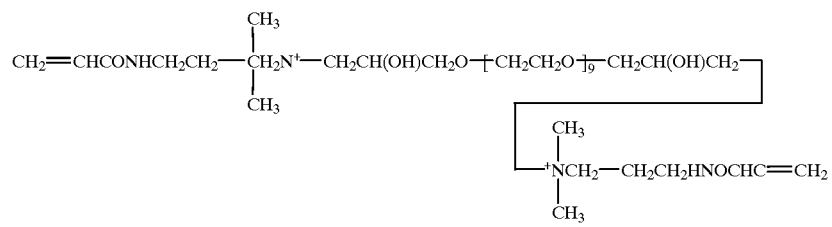
(Compound 1-7)
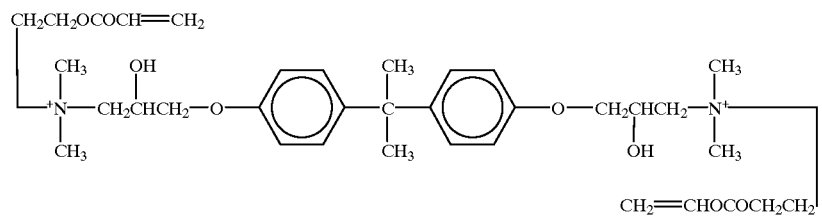
(Compound 2-1)
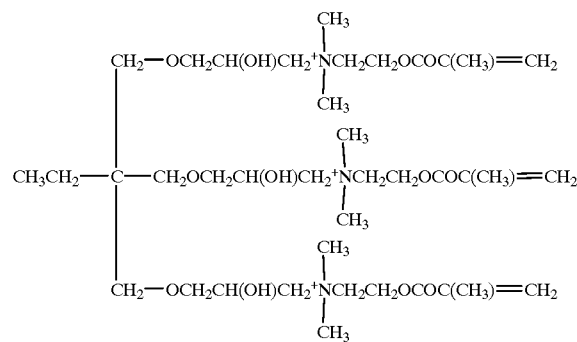

(Compound 3-1)
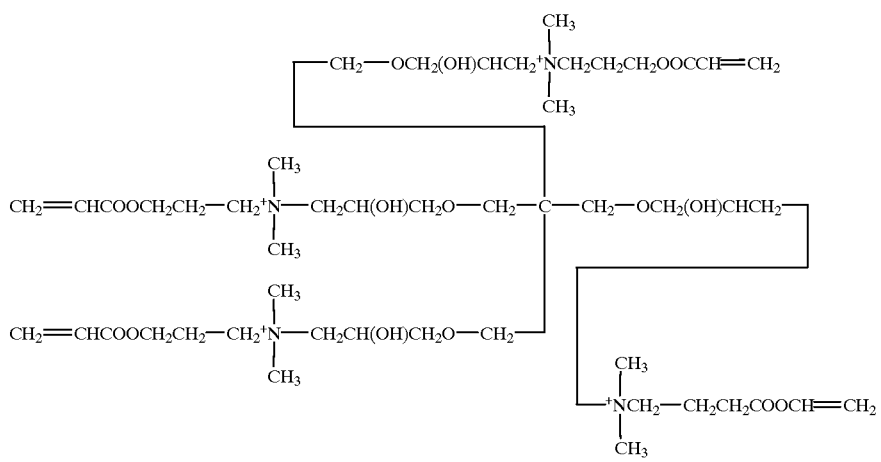
(Compound 4-1)
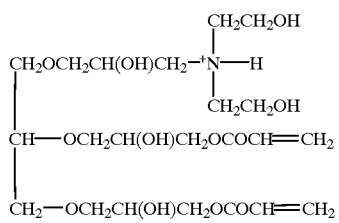
(Compound 4-2)
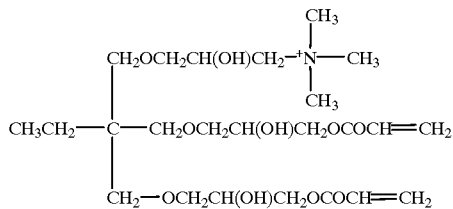
(Compound 4-3)
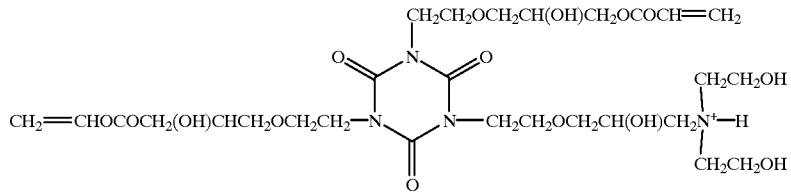
(Compound 4-4)
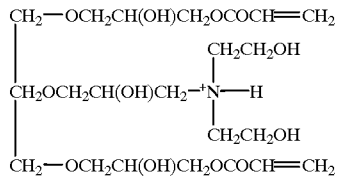
(Compound 4-5)
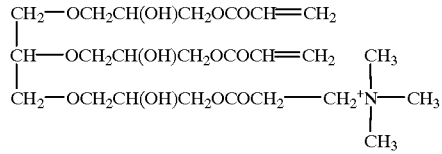

-continued
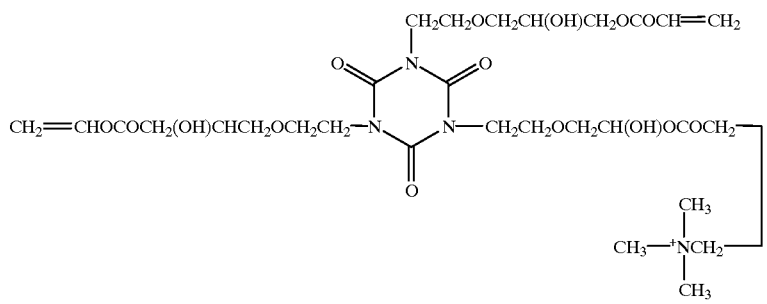
(Compound 4-6)
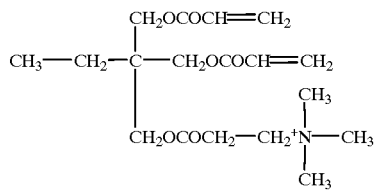
(Compound 4-7)
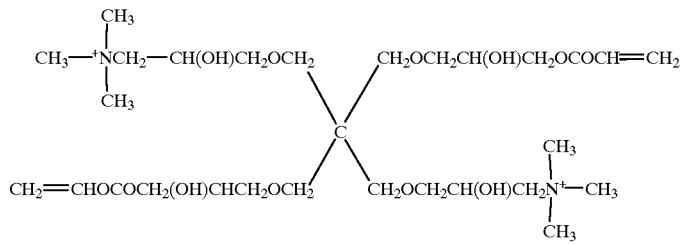
(Compound 5-1)
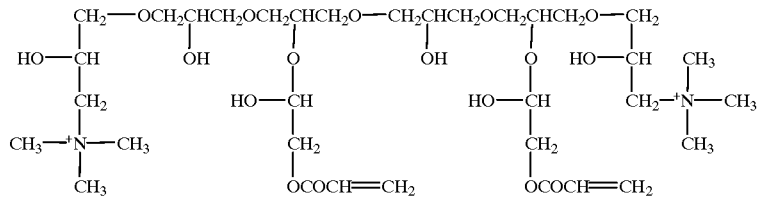
(Compound 5-2)
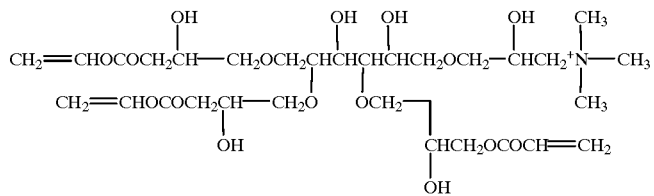
(Compound 6-1)
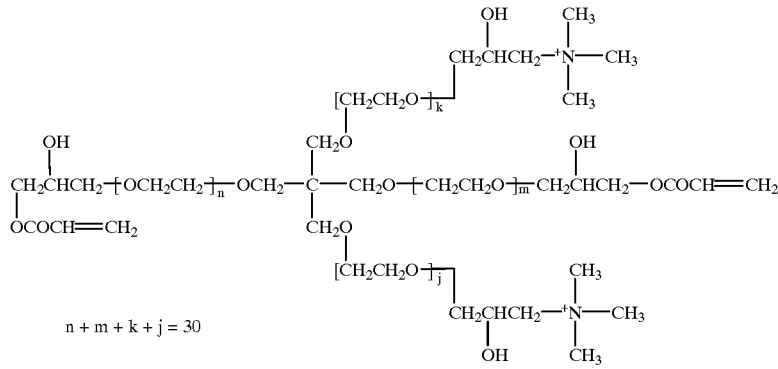
(Compound 7-1)
n + m + k + j = 30

(Compound 8-1)

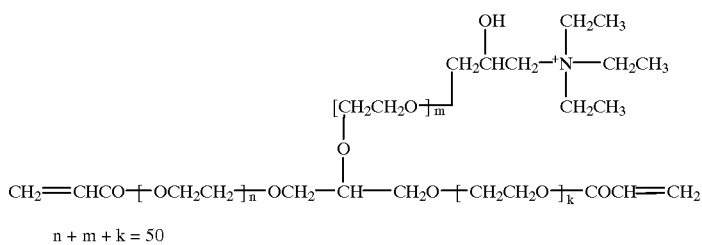

n + m + k = 50

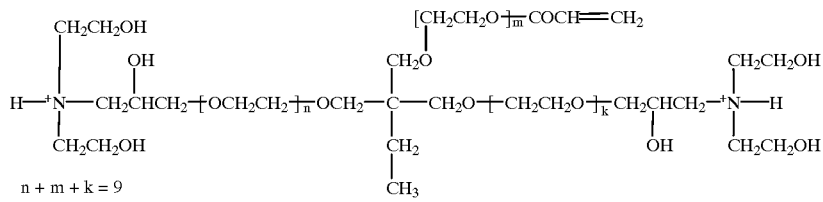

n + m + k = 9

The syntheses of the respective compounds may be conducted in the same manner as described above. It is also possible to optionally use, in combination, such a compound having an acryloyl group and two cationic groups in its molecule as exemplified below for the purpose of enhancing cationicity.

The use of these compounds has the merit of using only the compounds described above in polymerization to achieve the structure of the fine particles useful in the practice of the present invention. More specifically, the introduction of the cationic groups and the introduction of the crosslinked structure are conducted at the same time, and so a structural design is easy to be made, and a problem of reactivity to copolymerization is avoided.

In producing the particles of the present invention, an acrylic monomer having a cationic group is used in an amount ranging from 10 to 100 mol % to the total moles of the monomers.

In order to synthesize fine particles of a crosslinked resin using such hydrophilic monomers as described above, the following processes may be used.

The processes for preparing the fine particles of the crosslinked resin using these monomers are classified as follows.

(1) Precipitation polymerization process:

Monomers are polymerized in water or an alcohol, so that polymerization and crosslinking are allowed to progress at the same time to grow particles. The formed product is obtained in a state suspended in the solvent. At this time, a cationic polymer may be dissolved in the solvent in advance of using it as a nucleus for the growth of the particles, thereby containing it in the interior of the particles. It is also permissible to impart emulsifying ability to the polymer to be dissolved in advance, thereby facilitating formation of particles.

(2) Non-aqueous suspension polymerization process:

A cationic monomer and a crosslinkable monomer are dissolved in water or an alcohol, and the solution is stabilized in the state of droplets in a water-insoluble solvent such as toluene using a surfactant or a polymeric surfactant, thereby advancing the polymerization of the monomers in the droplets. In this case, a polymer having surface activity may also be used as a reversed phase emulsifier.

Any of these two processes may be used.

The cationic fine particles of the crosslinked resin used in the present invention desirably have an average particle diameter ranging from 0.1 to 100 μm, preferably from 0.1 to 30 μm. If the average particle diameter exceeds 100 μm, the resulting printing medium causes remarkable deterioration in resolution even when printing is performed on the printing medium of large size. If the average particle diameter is smaller than 0.1 μm on the other hand, such fine particles tend to aggregate and are also difficult to be produced. In general, the fine particles having an average particle diameter ranging from 0.1 to 10 μm are preferably prepared by the suspension polymerization process, while the fine particles having an average particle diameter ranging from 10 to 100 μm are preferably prepared by the precipitation polymerization process.

In order for the fine particles to attain transparency, it is necessary to adjust their particle diameter within a range of from one third to one fourth as small as a shorter wavelength of visible light and make a difference in refractive index between the fine particles and a material for forming the medium slight. This adjustment can reduces light scattering to attain transparency. When the average particle diameter of the fine particle is reduced to 0.1 to 0.4 μm, the transparency of the fine particles becomes high. Therefore, such fine particles are suitable for use in producing printing media to be used in application purposes of which transparency is required. It is possible to form a transparent ink-receiving layer by using, for example, an acrylic resin as a binder, while a difference in refractive index between the fine particles and the binder is made slight.

The cationic fine particles of the crosslinked resin used in the present invention are high in crosslink density compared with high water-absorbent particles used in other application purposes, and their water absorption capacity is at most 25 times, preferably at most 10 times. If the water absorption capacity exceeds 25 times, the resulting printing medium tends to remarkably cause separation of a print from a base material due to swelling of a coating film and softening of the base material when printed, so that the durability and rub-off resistance of the print are deteriorated.

The term "water absorption capacity" as used herein means a ratio of the volume of fine particles when absorbing ink or water up to saturation to the volume of the fine particles in a dry state. This measurement is conducted by photographs taken through an optical microscope, or normally by absorbing a liquid in dry particles of a predetermined weight up to saturation, removing water not absorbed by filtration or the like and then weighing the fine particles again, thereby calculating the ratio.

The particle of the present invention has a porous structure. Namely, the particle has many pores which are communicated with each other inside the particle. The particle of the present invention is distinguished from a spherical non-porous particle in this point.

The ink-receiving layer in the present invention contains the cationic fine particles of the crosslinked resin and requires a binder resin binding these particles.

The binder resin is required to bind the fine particles of the resin and at the same time to pass inks through the binder itself, to have a good adhesion to a base material and to form a coating film having a high water resistance.

Substances having such performance include (1) high-molecular compounds which are insoluble in water, but exhibit hydrophilicity, (2) water-soluble or hydrophilic high-molecular compounds having crosslinkability, (3) water-soluble polymers and crosslinking agents therefor, and (4) polymerizable oligomers or polymers.

The high-molecular compounds (1) may include alcohol-soluble acrylic resins; acetalized polyvinyl alcohol; and self-emulsifiable polyurethane resins, self-emulsifiable polyurea resins, self-emulsifiable polyester resins and self-emulsifiable acrylic resins, the compositions of said self-emulsifiable resins being adjusted within limits substantially insoluble in water. The term "self-emulsifiable" means a nature of such a resin that it is a substance hardly soluble or insoluble in water, but having no high hydrophobicity, and it has both hydrophilicity and hydrophobicity by itself, and is high in molecular weight and suspendible in water by itself, namely, without addition of a surfactant. Examples of such self-emulsifiable polyurethane or polyurea resins include those obtained by stably dispersing or dissolving a polyurethane resin or polyurea resin obtained by reacting a polyol such as polyester polyol or polyether polyol, or a polyamine such as polyester polyamine or polyether polyamine with an aromatic, aliphatic or alicyclic diisocyanate and optionally a chain extender in water without using any emulsifier. As methods for imparting good affinity for water to the respective resins, there may be used (a) a method of introducing an ionic group such as a carboxyl, sulfonic or phosphoric group into their side chains or terminals, and (b) a method of using a water-soluble polyol such as polyethylene glycol as a hydrophilic material in a part of the polyol or polyamine. In order for these polyurethane or polyamine resins to have more enhanced film-forming property as a binder, it is also effective to use a chain extender to make the molecular weights of resins higher. As such a chain extender, an epoxy resin, a melamine resin or a compound having an aziridinyl group is used. The molecular weight of a high-molecular compound obtained by using such a chain extender ranges from hundreds of thousands to several millions. Since the high-molecular compound has such a high degree of polymerization, the binder can satisfy both absorption and water resistance on a certain level at the same time. In the case of the method (a), the self-emulsifiable polyurethane or polyurea resin preferably has an acid value of 15 to 150 mg(KOH)/g and is suspended in water with a base added as a neutralizing agent.

PREPARATION EXAMPLE 1 OF BINDER POLYMER

POLYURETHANE

After 1,035 parts of a polyester polyol were dehydrated at 100° C. under reduced pressure and then cooled down to 70° C., 397 parts of ethyl acetate were added, and the mixture was thoroughly mixed. Then, 157 parts of tolylene diisocyanate were added to conduct a reaction at 70° C. for 4 hours. The resultant prepolymer having isocyanate groups at its terminals was diluted with 795 parts of methyl ethyl ketone. After the resultant prepolymer solution was reacted with a solution of 30.8 parts of ethylenediamine and 127.8 parts of triethylenediamine in 2,560 parts of water, the solvent was removed under reduced pressure, thereby obtaining a transparent colloidal aqueous dispersion having a solid content of 30% and a pH of 8.0.

PREPARATION EXAMPLE 2 OF BINDER POLYMER

POLYURETHANE POLYUREA

Neopentyl glycol, hexamethylenediamine and tolylene diisocyanate were reacted to obtain a polyurethane polyurea resin having hydroxyl groups at its terminals. After 1,035 parts of the polyurethane polyurea resin were dehydrated at 100° C. under reduced pressure and then cooled down to 70° C., 397 parts of ethyl acetate were added, and the mixture was thoroughly mixed. Then, 157 parts of tolylene diisocyanate were added to conduct a reaction at 70° C. for 4 hours. The resultant prepolymer having isocyanate groups at its terminals was diluted with 795 parts of methyl ethyl ketone. After the resultant prepolymer solution was reacted with a solution of 30.8 parts of ethylenediamine and 127.8 parts of triethylenediamine in 2560 parts of water, the solvent was removed under reduced pressure, thereby obtaining a transparent colloidal aqueous dispersion having a solid content of 30% and a pH of 8.0.

PREPARATION EXAMPLE 3 OF BINDER POLYMER

ALCOHOL-SOLUBLE ACRYLIC RESIN

Fifty parts of N-methylolacrylamide, 30 parts of 3-chloro-2-hydroxypropyl methacrylate and 20 parts of methyl methacrylate were reacted to obtain a hydrophilic acrylic resin soluble in a mixed solvent of isopropyl alcohol and ethylene glycol monomethyl ether.

PREPARATION EXAMPLE 4 OF BINDER POLYMER

ALCOHOL-SOLUBLE ACRYLIC RESIN

Fifty parts of N,N-dimethylaminoacrylamide, 30 parts of Brenmer PE90 and 20 parts of methyl methacrylate were reacted to obtain a hydrophilic acrylic resin soluble in a mixed solvent of isopropyl alcohol and ethylene glycol monomethyl ether.

As the polyester resins, there are used thermoplastic polyester resins having carboxyl or sulfonic groups, obtained from a diol and a dicarboxylic acid, and having both hydrophobic and hydrophilic moieties in their molecules and a number average molecular weight of 5,000 or higher. Even in the case of the polyester resins, a polyisocyanate is used as a chain extender, whereby both hydrophilicity and water resistance can be satisfied at the same time as the resin is made its molecular weigt larger and also a suspended state stable to water.

PREPARATION EXAMPLE 5 OF BINDER POLYMER

POLYESTER

After 1,660 parts of isophthalic acid, 3,304 parts of hexamethylene glycol, 1,352 parts of neopentyl glycol and 0.5 part of dibutyltin oxide were charged to conduct esterification at from 180° C. to 220° C. for 5 hours, a condensation reaction was conducted at 230° C. for 5 hours to an acid value of 0.5. The reaction mixture was then cooled down to 120° C., and 5,840 parts of adipic acid and 2,014 parts of 2,2-dimethylolpropionic acid were added. The mixture was heated again to 170° C. to conduct a reaction at this temperature for 20 hours, thereby obtaining a polyester polyol having a hydroxyl value of 54.2 and an acid value of 68.6 and containing pendant carboxyl groups.

As the acrylic resins, there are used thermoplastic resins having carboxyl or sulfonic groups and both hydrophobic and hydrophilic moieties in their molecules, and having a weight average molecular weight of 15,000 or higher. The acrylic resins may also be subjected to chain extension by urethane modification to make their molecular weights higher.

As the water-soluble or hydrophilic high-molecular compounds (2) having crosslinkability, there are used systems in which a high-molecular compound having hydrophilic groups such as hydroxyl, glycidyl, carboxyl, amino and methylol groups is used in combination with a crosslinkable substance (an aldehyde, epoxy resin, blocked isocyanate or methylolmelamine) which can be reacted with the compound (2), and acrylic resins obtained by copolymerizing monomers having a self-crosslinking ability. More specifically, examples thereof include:

(a) Polyvinyl alcohol reacted with an acid anhydride such as maleic anhydride, succinic anhydride or phthalic anhydride, and an epoxy resin;

(b) An acrylic resin obtained by copolymerizing a glycidyl (meth)acrylate, and an acid anhydride;

(c) An alcohol-soluble and water-insoluble acrylic resin in which a water-soluble high-molecular compound having crosslinkable alkanol groups in its molecule is used in combination with any one of N-methylol(meth) acrylamide and N-butoxymethyl(meth)acrylamide;

(d) An amino type acrylic resin obtained by copolymerizing acrylic monomers having a primary, secondary or tertiary amino group in its side chain;

(e) A resin composition containing a polymer of ethylene oxide having at least two hydroxyl groups in its molecule and a blocked isocyanate; and (f) A methylolized polyamide resin or a methylolized polyamide resin grafted with acrylamide, and the like.

By coexisting each of these crosslinkable and water-soluble resins with a crosslinking agent and crosslinking it at the same time as the formation of a film, the resin is made water-insoluble. Therefore, the film formed has a good ink absorbency and a water resistance and binds fine particles.

Examples of the water-soluble resins (3) include natural resins such as albumin, gelatin, casein, starch, cationized starch, gum arabic and sodium alginate, and synthetic resins such as carboxymethyl cellulose, hydroxyethyl cellulose, polyamide, polyacrylamide, polyethyleneimine, polyvinyl pyrrolidone, quaternized polyvinyl pyrrolidone, polyvinylpyridinium halides, melamine resins, phenol resins, alkyd resins, polyurethane resins, acetal-modified polyvinyl alcohol, polyvinyl alcohol, ionically modified polyvinyl alcohol, polyester and sodium polyacrylate.

As crosslinking agents used herein, may be mentioned those applicable to crosslinking reactions using a hydroxyl group, such as ionic crosslinking with an aluminum complex, zirconium complex or the like and crosslinking with a polyepoxide, for example, known crosslinking agents such as aldehydes, water-soluble melamine resins and blocked isocyanates. Further, ionic crosslinking in a broad sense, in which a polymer complex composed of an anionic polymer and a cationic polymer is formed, may also be effective.

The polymerizable oligomer or polymers (4) are also useful as a binder. It is an advantageous method to form a matrix by ultraviolet curing for the purpose of forming a coating film which is hydrophilic but water-insoluble. The reason for it is that, when the fine particles are dispersed in the resin described above in an aqueous medium into a coating formulation, the penetration of a solvent into the interior of the fine particles is unavoidable, and so the solvent within the fine particles must be removed during a coating step or in a subsequent step. When an ultraviolet-curing oligomer is used, however, the penetration of the solvent into the interior of the fine particles is lessened, so that it is preferable because the application and drying of the coating formulation can be performed by applying extremely low energy.

In the case where an ultraviolet-curing resin is used, it is also used to irradiate ultraviolet radiation in a state that the surface of the resin is brought into contact under pressure with a permeable specular surface in order to obtain specular gloss, in addition to a method of directly irradiating ultraviolet radiation on the surface of the resin.

Examples of the ultraviolet-curing binder resins include the (meth)acrylic esters of polyhydric alcohols, glycols, polyethylene glycol, polyester polyol, polyether polyol, urethane-modified polyether or polyester and the like, and the (meth)acrylic esters of epoxy resins. Specific compounds thereof include ethylene glycol di(meth)acrylate, propanediol di(meth)acrylate, butanediol di(meth)acrylate, pentanediol di(meth)acrylate, hexanediol di(meth)acrylate, neopentyl glycol di(meth)-acrylate, neopentyl glycol hydroxypivalate di(meth)-acrylate, polyethylene glycol di(meth)acrylate having 10 to 100 ethylene oxide chains as repeating units, polypropylene glycol di(meth)acrylate and copolymers thereof, polytetrafuran glycol di(meth)acrylate, trimethylolpropane tri(meth)acrylate, pentaerythritol tri (meth)acrylate, pentaerythritol tetra(meth)acrylate, the acrylic esters of water-soluble polyepoxides, and urethane-modified products of the above-mentioned compounds. When a urethane-modified product is used, it is desirable to select a non-yellowing aliphatic isocyanate in order to prevent the yellowing of the resulting printing medium. In order to provide an ultraviolet-curing coating formulation, it is possible to use catalysts commonly used as photo-initiated catalysts. Among those, substances having a hydrophilicity and scarcely causing yellowing of a cured film are preferred. Typical examples thereof include photo-cleavable compounds such as Irgacure 184, Irgacure 651 and Irgacure 2959. In the case where the ultraviolet-curing resin is used, a compounding ratio by weight of the fine particles of the resin to the ultraviolet-curing resin is preferably within a range of from 90:10 to 5:95. The ratio of the fine particles of the resin to the ultraviolet-curing resin may vary according to the molecular weight, softening point and the like of the resin used. In the form that the fine particles of the resin are mainly used, the ratio is within a range of from 90:10 to 50:50, while in the form that the resin is mainly used, the ratio is within a range of from 50:50 to 5:95. The ultraviolet-curing resin and the fine particles are thoroughly dispersed, and the resultant dispersion is applied on a base material and subjected to exposure of ultraviolet radiation, thereby completing an ink-receiving layer.

As the base material used in the present invention, there may be used any conventionally known material. Specific examples thereof include films on sheets of plastic films such as polyester resins, diacetate resins, triacetate resins, polystyrene resins, polyethylene resins, polycarbonate resins, polymethacrylate resins, cellophane, celluloid, polyvinyl chloride resins and polyimide resins, and glass plates. The base material used may be either transparent or opaque.

In order to produce a printing medium used in an application purpose that an image is observed by reflection, a white inorganic pigment may be added to a base material to enhance its whiteness degree and a permeability to inks. Examples of such inorganic pigments addable include talc, calcium carbonate, calcium sulfate, magnesium hydroxide, basic magnesium carbonate, alumina, synthetic silica, calcium silicate, diatomaceous earth, alumina hydroxide, clay, barium sulfate, titanium oxide, zinc oxide, zinc sulfide, satin white, silicon oxide and lithopone and the like.

The mixing ratio by weight of the resin particles to the binder is preferably within a range of from 5:95 to 90:10, more preferably from 30:70 to 70:30. If the content of the resin particles is lower than the lower limit of the above range, the effect of enhancing water absorbency is not markedly brought about. If the content of the resin particles is higher than the upper limit of the above range, the resulting printing medium becomes opaque, and the adhesion of the ink-receiving layer to the base material is lowered, resulting in reduction of practicability.

The thickness of the ink-receiving layer may vary depending on a shot-in ink quantity, but is preferably within a range of from 1 to 200 $\mu$m, more preferably from 3 to 50 $\mu$m.

A process for forming an ink-receiving layer on the base material may comprises preparing a coating formulation by dissolving or dispersing the above-mentioned materials in a suitable solvent and applying the coating formulation to the surface of the base material by a known method, for example, a roll coater, a blade coater, an air knife coater, a gate roll coater, a bar coater, a size pressing, Symsizer, a spray coating, a gravure coating or a curtain coater process. In order to smooth the coating surface or enhance the strength of the surface, the thus-coated base material may be subjected to a supercalendering treatment.

In the case where a layer having no smoothness but having a high ink-absorbing speed and the ink-receiving layer according to the present invention are used as a lower layer and an upper layer, respectively, for an ink-receiving layer, there may be used a method in which the coating surface is subjected to a mirror finish treatment by bringing it into contact under pressure with a mirror finished surface roll, after the application of the upper layer and while the upper layer is in a wet state. The smoothness of the specular surface is transferred to the coating surface by using the mirror finished surface roll, whereby higher smoothness is achieved as compared with the drying at a free surface, and at the same time, fine voids are easy to be formed, leading to the enhancement of ink-absorbing speed.

Inks used in the image forming process according to the present invention comprises principally a coloring material (dye or pigment), a water-soluble organic solvent and water. Preferable examples of the dye include water-soluble dyes represented by direct dyes, acid dyes, basic dyes, reactive dyes and food colors. However, any dyes may be used so far as they can provide images satisfying required performance such as fixing ability, coloring ability, brightness, stability, light fastness and the like in combination with the above-described printing medium.

The water-soluble dyes are generally used by dissolving them in water or a solvent composed of water and at least one organic solvent. As a preferable solvent component for these dyes, there may be used a mixed solvent composed of water and at least one of various water-soluble organic solvents. It is however preferable to control the content of water in an ink within a range of from 20 to 90% by weight, preferably from 60 to 90% by weight.

A solubilizing agent may also be added to the ink for remarkably enhancing the solubility of the water-soluble dye in the solvent. In order to improve the properties of the ink, additives such as a viscosity modifier, a surfactant, a surface tension modifier, a pH adjuster, a resistivity regulative agent and/or a storage stabilizer may be further added to the ink before use.

As an image forming method in which the above-described inks are applied to the printing medium to conduct printing, an ink-jet recording method is preferred, and any system may be used so far as the inks can be effectively ejected out of orifices to apply the inks to the printing medium. Among others, a system described in Japanese Patent Application Laid-Open No. 54-59936, in which an ink undergoes a rapid volumetric change by an action of thermal energy applied to the ink, so that the ink is ejected out of an orifice by the working force generated by this change of state, may be effectively used.

The present invention will hereinafter be described more specifically by the following examples. Incidentally, all designations of "part" or "parts" as will be used in the following examples mean part or parts by weight unless expressly noted.

SYNTHESIS EXAMPLE 1

PREPARATION OF PARTICLES

Added to 100 g of Compound 1-1 were 10 g of water, 0.1 g of 2,2'-azobisamidinopropane hydrochloride as a polymerization catalyst and 5 g of Nikkol ECT-7 (trade name, a carboxylated product of an adduct of tridecyl alcohol with 7 mol of ethylene oxide) as an emulsifier. The mixture was added dropwise to 200 g of a mixed solvent of methyl ethyl ketone and ethylene glycol monomethyl ether (mixing ratio= 50:50) to emulsify the mixture with stirring under emulsifying conditions that the number of revolutions was 5,000 rpm and stirring time was 15 minutes. The resultant emulsion was heated to 60° C. to conduct a reaction for 7 hours at 2,000 rpm under a nitrogen atmosphere. The thus-obtained dispersion of particles was soft flow without interparticle adhesion. This dispersion was washed with water and ethyl alcohol and dried by heating at 80° C. for 10 hours. Thereafter, the dried product was ground by a small grinder, and the particle diameter of the resultant particles was measured through a microscope. The water absorption capacity at saturation was measured by absorbing water in the particles.

The average particle diameter of the crosslinked resin particles thus produced was 15 $\mu$m, and the water absorption capacity was about 3 times by volume.

SYNTHESIS EXAMPLE 2

PREPARATION OF PARTICLES

Added to 100 g of Compound 1–7 were 20 g of water, 0.3 g of 2,2'-azobisamidinopropane hydrochloride as a polymerization catalyst and 12 g of Emulsifier Solution A (Note 1, described below) as an emulsifier. The mixture was added dropwise to 200 g of a mixed solvent of methyl ethyl ketone and ethylene glycol monomethyl ether (mixing ratio=50:50) to emulsify the mixture with stirring under emulsifying conditions that the number of revolutions was 8,000 rpm and stirring time was 15 minutes. The reaction conditions were the same as in Synthesis Example 1.

The thus-obtained dispersion of particles was washed thoroughly with ethylene glycol monomethyl ether to remove the materials of the emulsifier solution. The resultant particles were dried by heating at 80° C. for 10 hours. Thereafter, the dried particles were ground by a small grinder, and the particle diameter and water absorption capacity at saturation of the ground particles were measured.

The average particle diameter of the crosslinked resin particles thus produced was 7 $\mu$m, and the water absorption capacity was about 2 times by volume.

(Note 1) Emulsifier Solution A: a solution of a 50:50 (by weight) copolymer of methyl methacrylate and Brenmer PE 200 (trade name, product of Nippon Oil & Fats Co., Ltd.; an acrylic ester monomer having an ethylene oxide chain at its side chain) in methyl ethyl ketone and ethylene glycol monomethyl ether (50:50 by weight); solid content: 25%.

SYNTHESIS EXAMPLE 3

PREPARATION OF PARTICLES

Added to 80 g of the hydrochloride of a quaternized product of N,N-dimethylamino-2-hydroxypropylacrylamide and 20 g of methylenebisacrylamide were 25 g of water, 25 g of isopropyl alcohol, 1.0 g of azobiscyanovaleric acid as a polymerization catalyst and 5 g of Phosphanol RS-410 (trade name, the phosphate of an adduct of tridecyl alcohol with ethylene oxide, product of Toho Chemical Industry Co., Ltd.) as an emulsifier. The mixture was added dropwise to 200 g of a mixed solvent of methyl ethyl ketone and ethylene glycol monomethyl ether (mixing ratio=50:50) to emulsify the mixture with stirring, under emulsifying conditions that the number of revolutions was 8,000 rpm and stirring time was 15 minutes. The reaction conditions were the same as in Synthesis Example 1.

The thus-obtained dispersion of fine particles was washed thoroughly with ethylene glycol monomethyl ether and water to remove the emulsifier. The resultant particles were dried by heating at 80° C. for 10 hours. Thereafter, the dried particles were ground by a small grinder, and the particle diameter and water absorption capacity at saturation of the ground particles were measured.

The average particle diameter of the crosslinked resin particles thus produced was 0.2 $\mu$m, and the water absorption capacity was about 1.3 times by volume.

SYNTHESIS EXAMPLE 4

PREPARATION OF PARTICLES

One hundred grams of Compound 8-1, 1.5 g of azobiscyanovaleric acid as a polymerization catalyst, 10 g of an emulsion (solid content: 25%) of Toresin FS500 (trade name, nylon 8 grafted with acrylamide, product of Teikoku Chemical Industry Co., Ltd.), which is a self-emulsifiable high-molecular compound, as an emulsifier and 40 g of water were mixed with stirring into a solution. The solution was added dropwise to 200 g of a mixed solvent of methyl ethyl ketone and ethylene glycol monomethyl ether (mixing ratio=50:50) to emulsify the solution with stirring under emulsifying conditions that the number of revolutions was 8,000 rpm and stirring time was 15 minutes. The reaction conditions were the same as in Synthesis Example 1. The thus-obtained dispersion of particles was washed thoroughly with ethylene glycol monomethyl ether and water to remove the emulsifier. The resultant particles were dried by heating at 80° C. for 10 hours. Thereafter, the dried particles were ground by a small grinder, and the particle diameter and water absorption capacity at saturation of the ground particles were measured.

The average particle diameter of the crosslinked resin particles thus produced was 1.0 $\mu$m, and the water absorption capacity was about 2.5 times by volume.

SYNTHESIS EXAMPLE 5

PREPARATION OF PARTICLES

A synthesis reaction was conducted in substantially the same manner as in Synthesis Example 2 using Compound 7-1 to prepare fine particles of a crosslinked resin, whose average particle diameter and water absorption capacity at saturation were 3.5 $\mu$m and about 8.6 times by volume, respectively.

SYNTHESIS EXAMPLE 6

PREPARATION OF PARTICLES

One hundred grams of Compound 8-1, 30 g of 2-hydroxyethyl methacrylate, 0.5 g of 2,2'-azobisamidinopropane hydrochloride as a polymerization catalyst, 10 g of an emulsion (solid content: 25%) of Toresin FS500 (trade name, nylon 8 grafted with acrylamide, product of Teikoku Chemical Industry Co., Ltd.), which is a self-emulsifiable high-molecular compound, as an emulsifier and 40 g of water were mixed with stirring into a solution. The solution was added dropwise to 200 g of a mixed solvent of methyl ethyl ketone and ethylene glycol monomethyl ether (mixing ratio=50:50) to emulsify the solution with stirring under emulsifying conditions that the number of revolutions was 8,000 rpm and stirring time was 15 minutes. The reaction conditions were the same as in Synthesis Example 1. The thus-obtained dispersion of particles was washed thoroughly with ethylene glycol monomethyl ether and water to remove the emulsifier. The resultant particles were dried by heating at 80° C. for 10 hours. Thereafter, the dried particles were ground by a small grinder, and the particle diameter and water absorption capacity at saturation of the ground particles were measured. The average particle diameter of the crosslinked resin particles thus produced was 0.1 $\mu$m, and the water absorption capacity was about 10.0 times by volume.

SYNTHESIS EXAMPLE 7

PREPARATION OF PARTICLES

A reaction was conducted in the same manner as in Synthesis Example 1 except that a compound, in which the number of repeating units of ethylene oxide chains in the chemical structure of Compound 1–6 is 50, was used, thereby obtaining fine particles of a crosslinked resin, whose average particle diameter and water absorption capacity at saturation were 50 $\mu$m and about 25 times by volume, respectively.

SYNTHESIS EXAMPLE 18

PREPARATION OF PARTICLES

Added to 100 g of Compound 5-2 were 10 g of isopropyl alcohol, 0.1 g of 2,2'-azobis-amidinopropane hydrochloride as a polymerization catalyst, 0.1 g of thioglycolic acid as a chain-transfer agent and 15 g of Nikkol ECT-7 (trade name, a carboxylated product of an adduct of tridecyl alcohol with 7 mol of ethylene oxide) as an emulsifier. The mixture was added dropwise to methyl ethyl ketone to emulsify the mixture with stirring under emulsifying conditions that the number of revolutions was 5,000 rpm and stirring time was 15 minutes. The resultant emulsion was heated to 60° C. to conduct a reaction for 7 hours at 2,000 rpm under a nitrogen atmosphere. The thus-obtained dispersion of particles was soft flow without interparticle adhesion. The reaction mixture was filtered to remove the emulsifier therefrom and then washed with methyl ethyl ketone. The thus-obtained suspension in methyl ethyl ketone was classified by means of a fluidized-bed classifier to remove coarse particles. The average particle diameter of the suspended particles was 0.45 μm as measured by a dynamic light scattering method. Besides, the water absorption capacity at saturation was about 9 times by volume measured by absorbing water therein.

SYNTHESIS EXAMPLE 9

PREPARATION OF PARTICLES

Fine particles were synthesized in the same manner as in Synthesis Example 8 except that Compound 8-1 was used. The average particle diameter of the suspended particles thus obtained was 0.3 μm. Besides, the water absorption capacity at saturation was about 25 times by volume measured by absorbing water therein.

PREPARATION OF PRINTING MEDIA

EXAMPLE 1

| | |
|---|---|
| Dry particles of Synthesis Example 1 | 24 parts |
| Acetalized polyvinyl alcohol (S-lex KX-1, trade name; aqueous solution; nonvolatile content: 8%; product of Sekisui Chemical Co., Ltd.) | 100 parts. |

The above composition was dispersed by a high-speed stirrer to prepare a coating formulation. A polyethylene terephthalate film (thickness: 100 μm, product of Toray Industries, Inc.) was used as a transparent base material. The coating formulation was applied to this base material by a bar coater process so as to give a dry coating thickness of 35 μm. The thus-coated base material was dried at 120° C. for 5 minutes in a drying oven, thereby obtaining a printing sheet.

EXAMPLE 2

| | |
|---|---|
| Dry particles of Synthesis Example 2 | 10 parts |
| Isopropyl alcohol solution (solid content: 25%) of a polyvinyl alcohol resin reacted with succinic anhydride | 100 parts. |

The above composition was dispersed by a high-speed stirrer to prepare a coating formulation. The coating formulation was applied to the same transparent base material as that used in Example 1 by a bar coater process so as to give a dry coating thickness of 25 μm. The thus-coated base material was dried at 85° C. for 10 minutes in a drying oven, thereby obtaining a printing sheet.

EXAMPLE 3

| | |
|---|---|
| Dry particles of Synthesis Example 3 | 25 parts |
| Isopropyl alcohol solution (solid content: 30%) of a polymer (weight average molecular weight: 45,000) of 2-hydroxyethyl methacrylate | 200 parts |
| Glyoxal (crosslinking agent) | 0.5 part. |

The above composition was dispersed by a high-speed stirrer to prepare a coating formulation. The coating formulation was applied to the same transparent base material as that used in Example 1 by a bar coater process so as to give a dry coating thickness of 25 μm. The thus-coated base material was dried at 135° C. for 5 minutes in a drying oven, thereby obtaining a printing sheet.

EXAMPLE 4

| | |
|---|---|
| Dry particles of Synthesis Example 4 | 25 parts |
| Cationically modified polyvinyl alcohol (C-Polymer; trade name; 10% aqueous solution; product of Kuraray Co. Ltd.) | 150 parts |
| 50% Isopropyl alcohol solution of aluminum propoxide (crosslinking agent) | 0.2 part. |

The above composition was dispersed by a high-speed stirrer to prepare a coating formulation. The coating formulation was applied to the same transparent base material as that used in Example 1 by a bar coater process so as to give a dry coating thickness of 25 μm. The thus-coated base material was dried at 135° C. for 5 minutes in a drying oven, thereby obtaining a printing sheet.

EXAMPLE 5

| | |
|---|---|
| Dry particles of Synthesis Example 5 | 25 parts |
| Aqueous solution (solid content: 25%) of a polyvinyl alcohol resin | 100 parts |
| Denacol EX314 (trade name; glycerol triglycidyl ether; product of Nagase Chemicals, Ltd.) | 10 parts |
| 50% Aqueous solution of zinc oxide | 0.2 part. |

The above composition was dispersed by a high-speed stirrer to prepare a coating formulation. The coating formulation was applied to the same transparent base material as that used in Example 1 by a bar coater process so as to give a dry coating thickness of 25 μm. The thus-coated base material was dried at 120° C. for 10 minutes in a drying oven, thereby obtaining a printing sheet.

EXAMPLE 6

| | |
|---|---|
| Dry particles of Synthesis Example 6 | 25 parts |
| Cationically modified polyvinyl alcohol (C-Polymer; trade name; 10% aqueous solution; product of Kuraray Co. Ltd.) | 100 parts |
| Blocked polyisocyanate (Elastolon BN-5; | 3 parts |

-continued

| | |
|---|---|
| trade name; 30% aqueous solution; product of Dai-ichi Kogyo Seiyaku Co., Ltd.) | |
| Organotin compound (Elastolon Catalyst 64; product of Dai-ichi Kogyo Seiyaku Co., Ltd.) | 0.1 part. |

The above composition was dispersed by a high-speed stirrer to prepare a coating formulation. The coating formulation was applied to the same transparent base material as that used in Example 1 by a bar coater process so as to give a dry coating thickness of 25 μm. The thus-coated base material was dried at 140° C. for 5 minutes in a drying oven, thereby obtaining a printing sheet.

EXAMPLE 7

| | |
|---|---|
| Dry particles of Synthesis Example 2 | 25 parts |
| Polyethylene glycol #200 diglycidyl ether acrylate (ultraviolet-curing oligomer; product of Nagase Chemicals, Ltd.) | 25 parts |
| Darocure 1173 (trade name; product of CIBA-GEIGY (Japan) Limited) | 0.5 part |
| CR-50 (trade name; titanium oxide pigment; product of Ishihara Sangyo Kaisha, Ltd.) | 3 parts. |

The above composition was mixed and dispersed by a homomixer to obtain a white solventless coating formulation. The coating formulation was applied to the same transparent base material as that used in Example 1 by a bar coater process and then cured by means of an ultraviolet irradiation apparatus, thereby obtaining a sheet having an ink-receiving layer having a coating thickness of 60 μm.

EXAMPLE 8

| | |
|---|---|
| Dry particles of Synthesis Example 5 | 20 parts |
| 30% Isopropyl alcohol solution of an alcohol-soluble acrylic resin (copolymer of 2-hydroxyethyl acrylate/acrylamide/methyl methacrylate; weight average molecular weight: 45,000) | 100 parts |

The above composition was dispersed by a homomixer and applied to a biaxially stretched polyethylene terephthalate film having a thickness of 75 μm by a bar coater so as to give a dry coating thickness of 20 μm. The thus-coated film was dried at 85° C. for 10 minutes, thereby producing a transparent printing medium.

EXAMPLE 9

| | |
|---|---|
| Dry particles of Synthesis Example 6 | 20 parts |
| Self-emulsifiable polyurethane/ polyurea resin (Pateracol IJ2, trade name; about 20% aqueous dispersion; product of Dainippon Ink & Chemicals, Incorporated) | 100 parts |
| Water | 150 parts |
| Isopropyl alcohol | 150 parts. |

The above components were thoroughly mixed by a high-speed homogenizer and then subjected to a dispersion treatment by a Dyno Mill (manufactured by Shinmaru Enterprises Corporation) which is a continuous type sand mill. The coating formulation thus prepared was applied to a resin-coated base paper web by a wire bar coater. The thus-coated paper web was dried at 100° C. for 10 minutes, thereby producing a printing sheet according to the present invention, the ink-receiving layer of which had a dry coating thickness of 18 μm.

EXAMPLE 10

| | |
|---|---|
| Suspended particles synthesized in Synthesis Example 7 and dispersed in methyl ethyl ketone (solid content: 25%) | 100 parts |
| 25% Methyl ethyl ketone/methyl cellosolve solution of a copolymer of N-methylolacrylamide/2-hydroxy-ethyl methacrylate/methyl methacrylate | 50 parts. |

The above components were thoroughly mixed and applied to a PET film having a thickness of 80 μm so as to give a coating weight of 80 g/m². The thus-coated film was dried by a casting process controlled at 80° C. in a wet state, thereby producing a printing sheet according to the present invention. The dry coating thickness of its ink-receiving layer was 15 μm.

EXAMPLE 11

| | |
|---|---|
| Suspended particles synthesized in Synthesis Example 8 and dispersed in methyl ethyl ketone (solid content: 25%) | 100 parts |
| Aqueous suspension (solid content: 50%) of a self-emulsifiable acrylic resin (EL Polymer EL-480, trade name; product of Teikoku Chemical Industry Co., Ltd.) | 50 parts. |

The above components were thoroughly mixed and applied to a PET film having a thickness of 80 μm so as to give a coating weight of 80 g/m². The thus-coated film was dried by a casting process controlled at 80° C. in a wet state, thereby producing a printing sheet according to the present invention. The dry coating thickness of its ink-receiving layer was 15 μm.

EXAMPLE 12

| | |
|---|---|
| Suspended particles synthesized in Synthesis Example 9 and dispersed in methyl ethyl ketone (solid content: 25%) | 100 parts |
| Aqueous suspension (solid content: 20%) of a self-emulsifiable polyamide resin (Toresin FS500, trade name; product of Teikoku Chemical Industry Co., Ltd.) | 50 parts |
| SUMITEX RESIN M (trade name; water-soluble melamine resin; product of Sumitomo Chemical Co., Ltd.) | 3 parts |
| SUMITEX ACCELERATOR ACX (trade name; product of Sumitomo Chemical Co., Ltd.) | 0.1 part. |

The above components were thoroughly mixed and applied to a PET film having a thickness of 80 μm so as to give a coating weight of 80 g/m². The thus-coated film was dried by a casting process controlled at 80° C. in a wet state and subjected to a heat treatment at 125° C., thereby producing a printing sheet according to the present invention. The dry coating thickness of its ink-receiving layer was 15 μm.

COMPARATIVE EXAMPLE 1

A printing sheet was produced in the same manner as in Example 1 except that anionic high-water absorbent particles (SUMIKAGEL SP510, trade name; acrylic acid-vinyl alcohol copolymer; average particle diameter: 10 μm; product of Sumitomo Chemical Co., Ltd.) were used in place of the particles of Synthesis Example 1 used in Example 1.

COMPARATIVE EXAMPLE 2

A printing sheet was produced in the same manner as in Example 1 except that nonionic high-water absorbent particles (Acogel A, trade name; acrylic polymer emulsion; average particle diameter: 5 μm; product of Mitsui Cyanamid Co., Ltd.) were used in place of the particles of Synthesis Example 1 used in Example 1.

COMPARATIVE EXAMPLE 3

A printing sheet was produced in the same manner as in Example 3 except that particles, the water absorption capacity of which was adjusted to about 50 times by volume by reducing the amount of methylenebisacrylamide, which was the crosslinkable monomer used in Synthesis Example 3, to be used to one tenth, were used in place of the dry fine particles of Synthesis Example 3 used in Example 3.

PRINTING TEST

Using the respective sheets produced in Examples 1 to 8 and Comparative Examples 1 to 3, 7 test patches of yellow, cyan, magenta, black, green, red and blue colors were printed by means of a Bubble-Jet Color Printer BJC-600J (trade name, manufactured by Canon Inc.; charged with 4 water-based inks of yellow, cyan, magenta and black colors) to perform tests as to the following four items. The results are shown in Table 1.

1. Absorbing speed (drying property):

Paper for copying was laid to overlap a print sample discharged from the printer to determine whether ink transfer occurred or not, thereby ranking the test samples as to the absorbing speed in accordance with the following standard:

A: Ink transfer was scarcely recognized;
B: Ink transfer was recognized, but posed no practical problem;
C: Ink transfer was recognized, giving a stained feeling and posing practical problems.

2. Evenness of solid print pattern:

The evenness of the color test patches was visually observed to rank them as to the evenness of solid print pattern in accordance with the following standard:

A: Print was even and high in optical density;
B: Some unevenness was recognized, giving a feeling of unevenness;
C: Unevenness was recognized to a great extend, and optical density was partially insufficient.

3. Transparency:

The transparency of an image projected by an OHP was visually judged to rank it in accordance with the following standard:

A: The image was bright and high in optical density;
B: The image had somewhat dark portions, but was allowable;
C: The image was partially lacking in brightness and definition.

4. Resistance to water or rub-off when wetted:

After leaving a print sample to stand for a day, about 0.05 ml of water were dropped thereon. After 1 minute, a printed area was rubbed with filter paper to observe blurring occurred on the printed area and coloring of the filter paper, thereby ranking the resistance to coloring or rub-off when wetted in accordance with the following standard:

A: No blurring was observed, and coloring of the filter paper was also little;
B: No blurring was observed on the printed area, but the filter paper was colored;
C: Blurring of the printed area was remarkably observed, and the filter paper was also colored to a large extent.

TABLE 1

| | Absorbing speed | Evenness of solid print pattern | Transparency | Resistance to coloring or rub-off when wetted |
|---|---|---|---|---|
| Ex. 1 | A | B | C | B |
| Ex. 2 | A | B | B | B |
| Ex. 3 | A | A | A | A |
| Ex. 4 | A | A | B | A |
| Ex. 5 | A | A | B | A |
| Ex. 6 | A | A | B | A |
| Ex. 7 | B | A | C | A |
| Ex. 8 | A | A | A | B |
| Ex. 9 | A | A | A | A |
| Ex. 10 | A | A | A | A |
| Ex. 11 | A | A | A | A |
| Ex. 12 | B | A | A | A |
| Comp. Ex. 1 | B | B | C | C |
| Comp. Ex. 2 | B | B | C | C |
| Comp. Ex. 3 | B | B | B | C |

As apparent from Table 1, it is understood that according to the present invention, the water absorbency and brightness are equal to or better than those having an ink-receiving layer in which the conventional water-absorbent resin or particles high in water absorption capacity are used, and the resistance to coloring or rub-off when wetted is greatly improved.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printing medium comprising a base material and an ink-receiving layer provided on the base material, wherein the ink-receiving layer contains water-absorbing cationic fine particles of a crosslinked resin having an average particle diameter ranging from 0.1 to 100 μm and a water absorption capacity of at most 25 times by volume, and a binder resin, and the cationic fine particles of the resin are of a substance prepared by using a polyfunctional cationic compound having at least one cationic group and at least two polymerizable groups in its molecule.

2. The printing medium according to claim 1, wherein the average particle diameter of the fine particles of the resin is within a range of from 0.1 to 30 µm.

3. The printing medium according to claim 11, wherein the fine particles are porous.

4. The printing medium according to claim 1, wherein the water absorption capacity of the fine particles of the resin is at most 10 times by volume.

5. The printing medium according to claim 1, wherein the fine particles of the resin are of a substance obtained by polymerizing a cationic group-containing acrylic monomer in an amount ranging from 10 mol % to 100 mol %.

6. The printing medium according to claim 1, wherein the polyfunctional cationic compound is any one of cationic polyacryloyl compounds represented by the following general formulae

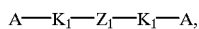  (1)

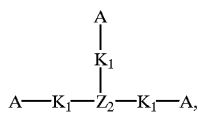  (2)

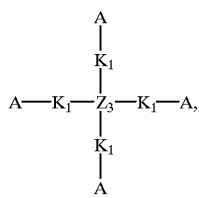  (3)

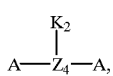  (4)

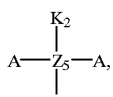  (5)

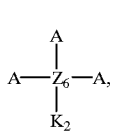  (6)

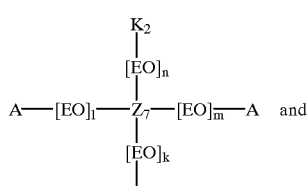  (7)

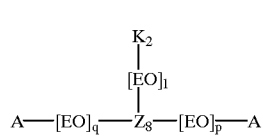  (8)

wherein $Z_1$ to $Z_8$ are independently a residue derived from a polyhydric alcohol or a polyepoxide, EO is ethylene oxide, $K_1$ is a cationic group in a molecular chain represented by any one of formulae

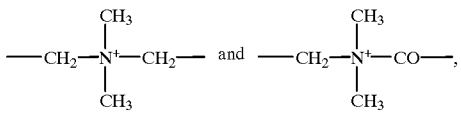

$K_2$ is a cationic group at a terminal of a molecular chain represented by any one of formulae

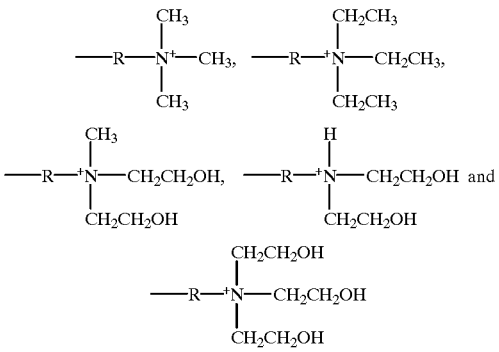

in which R is an atomic group selected from the group consisting of $-CH_2CH(OH)CH_2-$, $-CH_2-$, $-CH_2CH_2-$ and $-CH_2OCH_2-$, and n, m, k, p, q, i and j are independently the number of ethylene oxide chains and an integer ranging from 1 to 50, a counter ion to the cationic group of the compounds (1) to (8) is a residue of acids, and A is a residue of a (meth)acrylic ester or a (meth)acrylamide.

7. The printing medium according to claim 6, wherein A in the formulae (1) to (8) is selected from the group consisting of $CH_2=CHCOO(CH_2)_a-$, $CH_2=C(CH_3)COO(CH_2)_b-$, $CH_2=CHCONH(CH_2)_c-$ and $CH_2=C(CH_3)CONH(CH_2)_d-$ in which a, b, c and d are independently 0, 1 or 2.

8. The printing medium according to claim 1, wherein the binder resin is a hydrophilic and water-insoluble resin.

9. The printing medium according to claim 1, wherein the binder resin is a crosslinked water-soluble resin.

10. The printing medium according to claim 1, wherein the binder resin is a polymerized oligomer or polymer.

11. The printing medium according to claim 1, wherein a mixing ratio of the fine particles of the resin to the binder resin is within a range of from 5:95 to 90:10 by weight.

12. The printing medium according to claim 11, wherein the mixing ratio of the fine particles of the resin to the binder resin is within a range of from 30:70 to 70:30 by weight.

13. The printing medium according to claim 1, wherein a thickness of the ink-receiving layer is within a range of from 1 to 200 µm.

14. The printing medium according to claim 13, wherein the thickness of the ink-receiving layer is within a range of from 3 to 50 µm.

15. An image forming process, comprising ejecting inks in droplet form from orifices in response to printing signals to apply them to the printing medium according to any one of claims 1–5, 6–9 and 10–14 to form an image.

16. The image forming process according to claim 15, wherein the inks are four links of yellow, cyan, magenta and black colors.

17. The image forming process according to claim 15, wherein the inks are applied to the printing medium using an ink-jet system.

18. The image forming process according to claim 17, wherein the ink-jet system is a system in which thermal energy is applied to an ink to eject the ink.

19. A process for producing a printing medium, comprising coating a base material with a coating composition to form an ink-receiving layer, wherein the coating composition comprises water-absorbing cationic fine particles of a crosslinked resin having an average particle diameter ranging from 0.1 to 100 $\mu$m and a water absorption capacity of at most 25 times by volume, and a binder resin, and the cationic fine particles of the resin are of a substance prepared by using a polyfunctional cationic compound having at least one cationic group and at least two polymerizable groups in its molecule.

20. The process according to claim 19, wherein a thickness of the ink-receiving layer is within a range of from 1 to 200 $\mu$m.

21. The process according to claim 20, wherein the thickness of the ink-receiving layer is within a range of from 3 to 50 $\mu$m.

22. An image forming process, comprising steps of coating a base material with a coating composition to form an ink-receiving layer, and applying inks to the ink-receiving layer to form an image; wherein the coating composition comprises water-absorbing cationic fine particles of a crosslinked resin having an average particle diameter ranging from 0.1 to 100 $\mu$m and a water absorption capacity of at most 25 times by volume, and a binder resin, and the cationic fine particles of the resin are of a substance prepared by using a polyfunctional cationic compound having at least one cationic group and at least two polymerizable groups in its molecule.

23. The image forming process according to claim 22, wherein the inks are ejected in droplet form from orifices in response to printing signals to apply them to the ink-receiving layer.

24. The image forming process according to claim 22, wherein the inks are four inks of yellow, cyan, magenta and black colors.

25. The image forming process according to claim 22, wherein the inks are applied to the ink-receiving layer using an ink-jet system.

26. The image forming process according to claim 25, wherein the ink-jet system is a system in which thermal energy is applied to an ink to eject the ink.

* * * * *

UNITED STATES PATENT AND TRADEMARK OFFICE
CERTIFICATE OF CORRECTION

PATENT NO. : 6,001,466

DATED : December 14, 1999

INVENTOR(S) : HIROMICHI NOGUCHI, ET AL.

Page 1 of 3

It is certified that error appears in the above-identified patent and that said Letters Patent is hereby corrected as shown below:

ON THE COVER PAGE:

Item [30] Foreign Application Priority Data

"9-037048" should read --9-039048--.

IN THE DISCLOSURE:

COLUMN 1:

Line 35, "and" should read --and with--.

COLUMN 2:

Line 25, "of" should read --of the--.
Line 31, "is easy to" should read --easily--.
Line 32, "exude" should read --exudes--.

COLUMN 5:

Line 6, "A—[EO]$_l$—Z$_7$—[EO]$_m$—A and" should read --A—[EO]$_i$—Z$_7$—[EO]$_m$—A and--.

Line 14, "[EO]$_l$" should read --[EO]$_j$--.

UNITED STATES PATENT AND TRADEMARK OFFICE
CERTIFICATE OF CORRECTION

PATENT NO. : 6,001,466

DATED : December 14, 1999

INVENTOR(S) : HIROMICHI NOGUCHI, ET AL.

It is certified that error appears in the above-identified patent and that said Letters Patent is hereby corrected as shown below:

COLUMN 14:

Line 48, "a" should read --the--.
Line 50, "reduces" should read --reduce--.

COLUMN 17:

Line 5, "resin is made its molecular weigt" should read --resin's molecular weight is made--.

COLUMN 19:

Line 44, "comprises" should read --comprise--.

COLUMN 23:

Line 1, "SYNTHESIS EXAMPLE 18" should read --SYNTHESIS EXAMPLE 8--.
Line 5, "2,2'-azobis-amidinopropane" should read --2,2'-azobisamidinopropane--.

COLUMN 29:

Line 6, "claim 11," should read --claim 1,--.

UNITED STATES PATENT AND TRADEMARK OFFICE
CERTIFICATE OF CORRECTION

PATENT NO. : 6,001,466
DATED : December 14, 1999
INVENTOR(S) : HIROMICHI NOGUCHI, ET AL.

It is certified that error appears in the above-identified patent and that said Letters Patent is hereby corrected as shown below:

COLUMN 29:

Line 54, "A—[EO]$_1$—Z$_7$—[EO]$_m$—A" should read --A—[EO]$_i$—Z$_7$—[EO]$_m$—A--.

Line 61, "[EO]$_1$" should read --[EO]$_j$--.

COLUMN 30:

Line 61, "claims 1-5, 6-9 and 10-14to" should read --claims 1-14 to--.
Line 63, "links" should read --inks--.

Signed and Sealed this

Thirtieth Day of January, 2001

Attest:

Q. TODD DICKINSON

*Attesting Officer*    *Director of Patents and Trademarks*